United States Patent [19]
Jennings et al.

[11] Patent Number: 5,243,806
[45] Date of Patent: Sep. 14, 1993

[54] APPARATUS FOR WRAPPING ROUND BALES WITH SHEET MATERIAL

[75] Inventors: Richard E. Jennings; Douglas G. Branham, both of Lancaster, Pa.

[73] Assignee: Ford New Holland, Inc., New Holland, Pa.

[21] Appl. No.: 927,045

[22] Filed: Aug. 10, 1992

[51] Int. Cl.$^5$ .......................................... B65B 11/04
[52] U.S. Cl. ........................................ 53/118; 53/587; 53/389.2
[58] Field of Search .............. 53/118, 556, 587, 389.2, 53/389.3, 211, 389.1

[56] References Cited

U.S. PATENT DOCUMENTS

| | | | |
|---|---|---|---|
| 2,894,363 | 7/1959 | Voogd | 53/389.2 X |
| 4,578,932 | 4/1986 | Cooke | 53/587 |
| 4,697,402 | 10/1987 | Anstey | 53/587 X |
| 4,748,793 | 6/1988 | Brookman | 53/587 X |
| 4,956,968 | 10/1990 | Underhill | 53/587 |
| 5,020,299 | 6/1991 | Underhill | 53/465 |
| 5,036,642 | 8/1991 | Underhill | 53/587 |
| 5,079,898 | 1/1992 | Springs | 53/389.3 X |

FOREIGN PATENT DOCUMENTS

2717647  11/1978  Fed. Rep. of Germany ........ 53/556

Primary Examiner—John Sipos
Attorney, Agent, or Firm—Frank A. Seemar; Larry W. Miller

[57] ABSTRACT

An agricultural baler for making cylindrical bales of wrapped crop material. The baler includes a sledge assembly moveable between bale starting and full bale positions. A plurality of rollers on the sledge assembly cooperate with an apron to define a bale forming chamber. Wrapping is accomplished via a system that includes a dispensing mechanism carried on the sledge assembly for dispensing sheet material, such as net or the like, into the bale forming chamber whereupon it is wrapped circumferentially around a formed cylindrical bale of crop material as it is rotated in the chamber. The net wrapping system includes a net feed path having configuration that assures reliable net wrap start-up which in turn enhances overall operation.

6 Claims, 8 Drawing Sheets

APPARATUS FOR WRAPPING ROUND BALES WITH SHEET MATERIAL

FIELD OF THE INVENTION

This invention relates generally to a baler for forming cylindrical bales of crop material, commonly referred to as a round baler. More particularly, this invention pertains to an improved sheet material dispensing mechanism in the bale wrapping assembly for a round baler of the type disclosed in U.S. Pat. No. 5,036,642, issued in the name of Kenneth R. Underhill on Aug. 6, 1991, and assigned to a common assignee, Ford New Holland, Inc.

BACKGROUND OF THE INVENTION

Prior art balers of this type generally have a bale forming chamber defined by an apron comprising an array of side-by-side belts, transverse slats trained on chains, a plurality of rolls or a combination of these various elements, e.g., rolls and belts. Crop material, such as hay, is picked up from the ground as the baler traverses the field, fed into a fixed or adjustable chamber where it is rolled up to form a compact cylindrical bale. The formed bale is wrapped in its compacted form while still inside the bale forming chamber by net, twine or the like, prior to ejecting the bale from the chamber onto the ground for subsequent handling.

Exemplary of prior art round balers of the type generally referred to above is the baler disclosed in U.S. Pat. No. 5,036,642, mentioned above. This baler includes a mechanism for dispensing a net wrapping material into a bale forming chamber to circumferentially wrap a formed cylindrical bale. The dispensing mechanism includes a unique net insertion arrangement including a grasping portion for inserting the net tail into the chamber after the bale is formed. In net wrapping systems of this type it is crucial that a tail of adequate length is provided to assure initiation of the qrasping operation. When the tail is placed in the chamber it is pinched between the bale and the bale forming elements that rotate the bale during wrapping. A critical length is determined for consistent grasping of the tail and to maintain this consistency the tail length must be continually at the critical length.

Problems have been encountered in past attempts to accomplish the above advantages because the net being issued from the supply roll and guided to the grasping portion of the dispensing mechanism required a high friction clamp pressure for various reasons. Accordingly, the net pulling force provided by virtue of the tail being fed into the nip between the bale and the apron to draw it around the bale a it is held between the moving bale and apron must be increased. When an increased grasping force of this nature is required, net wrap starting is not consistent due to variations in the pulling force as the net material is being fed into a nip that varies due to the nature of the crop material of the formed bale. In this particular dispensing mechanism, comprising opposing flat clamping members through which the net is guided, it is important for the net to be maintained at the minimal level of friction force required for smooth feeding of the net downstream of the flat clamping members and thereby provide consistent net starting.

SUMMARY OF THE INVENTION

An important object of the present invention is to provide improved net wrapping apparatus for a round baler that enhances the reliability by consistently producing a net starting tail of uniform length and thereby improves the overall performance.

In pursuance of this and other important objects the present invention provides for a new and unique improvement to round baler apparatus having a main frame, a tailgate pivotally connected to the main frame, a sledge assembly mounted on the main frame for movement between a bale starting position and a full bale position, a plurality of rollers on the sledge assembly extending transversely of the main frame, an apron movably supported along a continuous path on the main frame and on the tailgate, an inner course of the apron path cooperating with the rollers of the sledge assembly to define a bale forming chamber, and dispensing means carried on the sledge assembly for dispensing sheet material into the bale forming chamber so that the sheet material is wrapped circumferentially around a cylindrical bale of crop material in the bale forming chamber. According its broadest aspects, the present invention contemplates that the dispensing means is pivotally mounted on the sledge assembly for movement between an extended position at which the sheet material is dispensed and a retracted position, and a unique guide arrangement is provided on the dispensing means. More particularly, the guide operatively engaging the sheet material under conditions where the dispensing means is in the retracted position, and the guide means moves out of contact with the sheet material when the dispensing means moves from the retracted position to the extended position to provide slack in the net and enhance net wrap starting.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
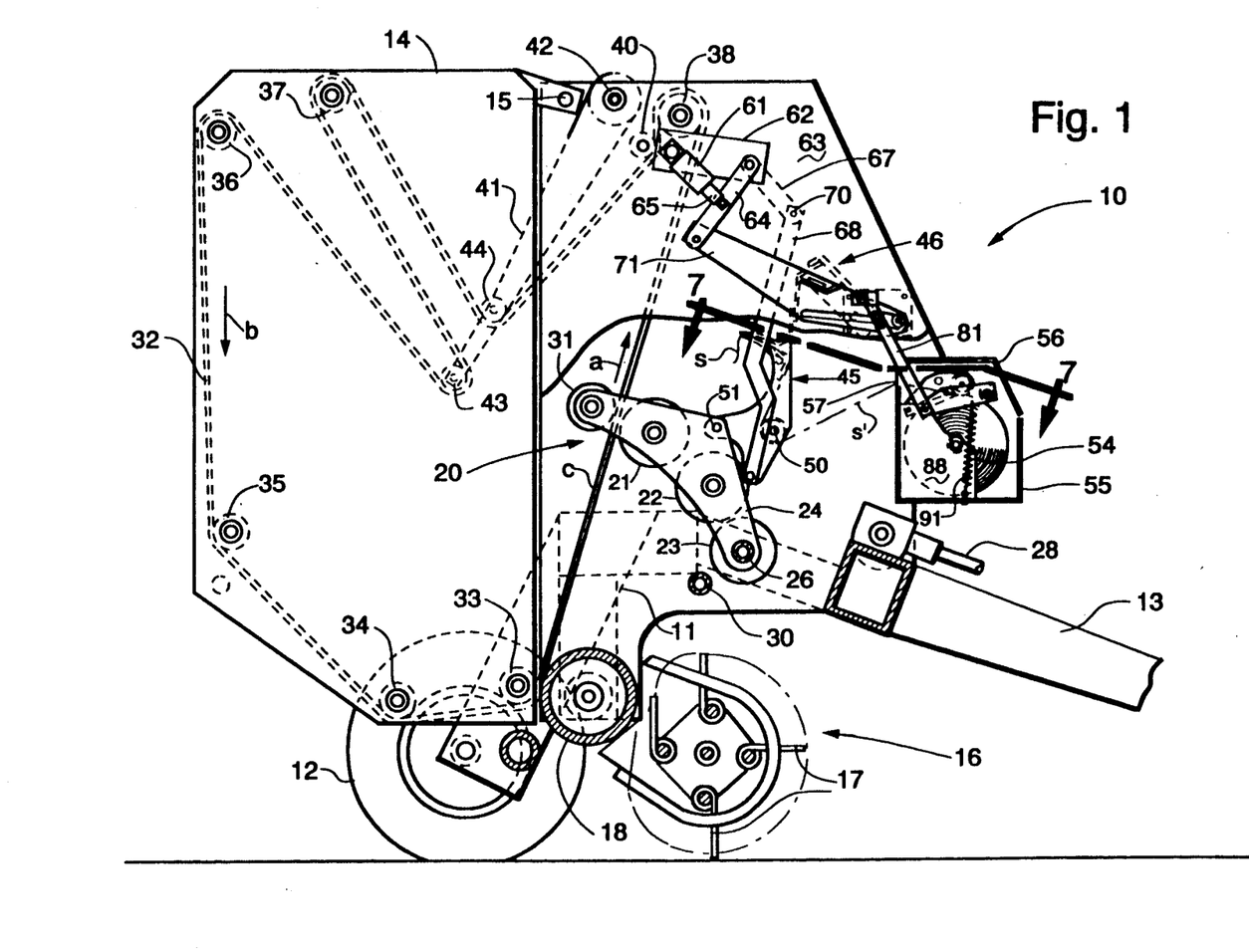
FIG. 1 is a diagrammatic side elevational view of a round baler in which the present invention is embodied and shows the elements in the bale starting position.

Referring now to the drawings for a more detailed description of the preferred embodiment of the invention, FIG. 1 shows an expandable chamber round baler 10 of the type disclosed in U.S. Pat. No. 5,036,642. As mentioned above and as will become apparent from the detailed description below, the present invention is directed to an improvement to sheet dispensing apparatus employed in balers of this nature and particularly, balers with net dispensing structure of the general type disclosed in U.S. Pat. No. 5,036,642.

Figure 2:
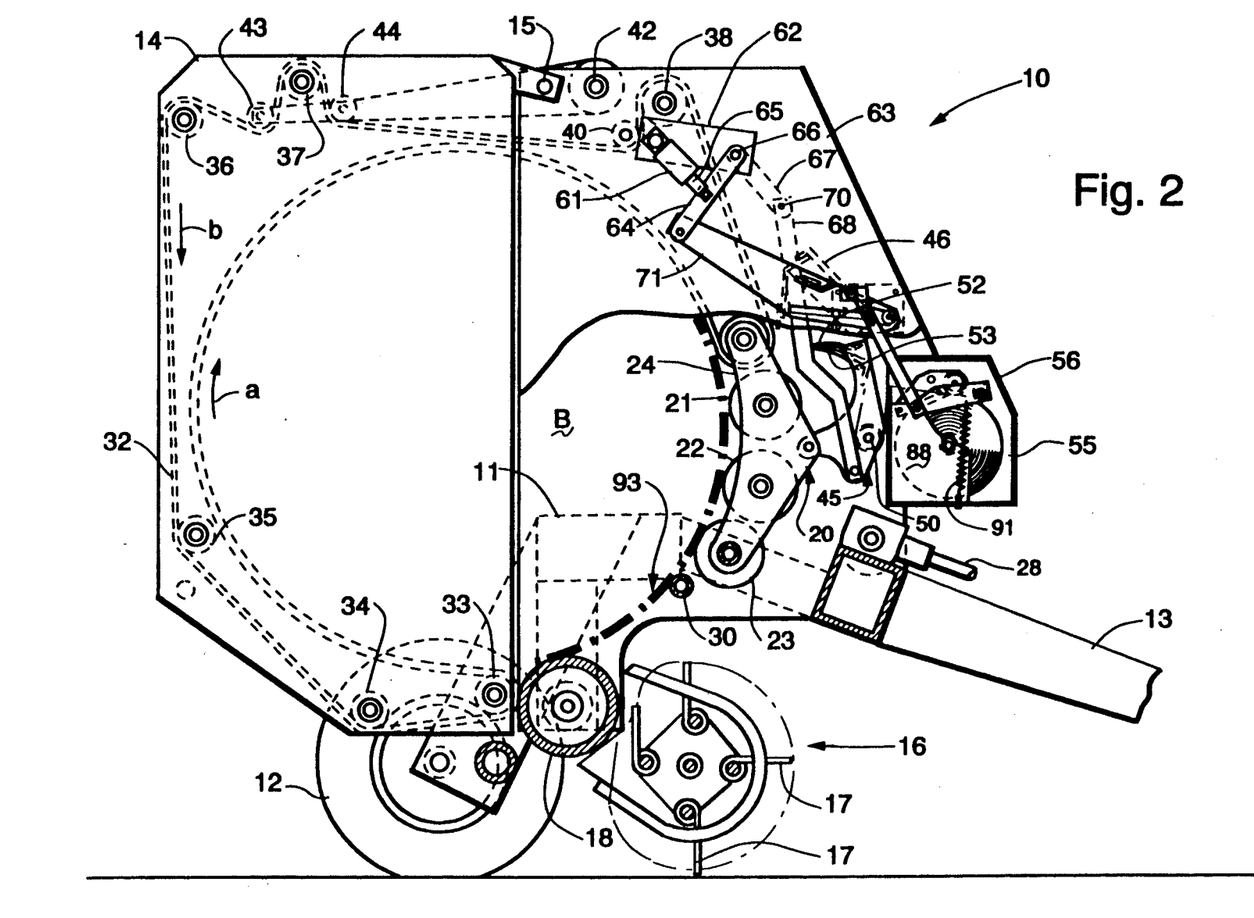
FIG. 2 is a diagrammatic side elevational view similar to FIG. 1 and show the elements in the full bale position.

Round baler 10 incorporates the preferred embodiment of such net dispensing apparatus and includes a main frame 11 supported by a pair of wheels 12 (only one shown). A tongue 13 is provided on the forward portion of main frame 11 for connection to a tractor. Pivotally connected to the sides of main frame 11 by a pair of stub shafts 15 is tailgate 14 which may be closed (as shown in FIGS. 1 and 2) during bale formation or pivoted open about stub shafts 15 to discharge a completed bale. A conventional pickup 16, mounted on main frame 11, is supported by a pair of suitable wheels (not shown). Pickup 16 includes a plurality of fingers or tines 17 movable in a predetermined path to lift crop material from the ground and deliver it rearwardly toward a floor roll 18, rotatably mounted on main frame 11.

Figure 3:
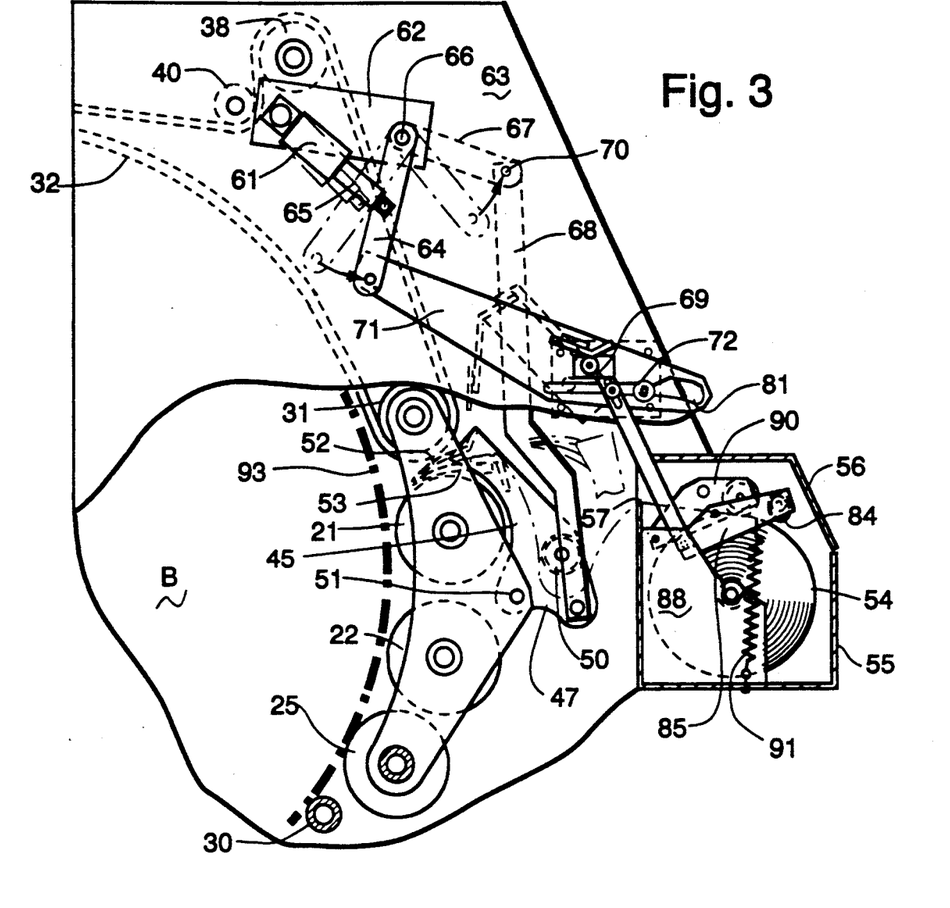
FIG. 3 is a detailed side elevation of the net wrapping apparatus of the baler shown in FIGS. 1 and 2.

The bale forming chamber is defined partly by a sledge assembly 20 comprising a plurality of rollers 21, 22, 23 extending transversely of the main frame 11 in the arcuate arrangement seen in FIGS. 1-3. Rollers 21, 22, 23 are journalled at their respective ends in a pair of spaced apart roll carrying arms 24, 25 (see FIG. 7). These arms 24, 25 are pivotally mounted inside main frame 11 on stub shafts 26, 27 for providing movement of sledge assembly 20 between the bale starting position shown in FIG. 1 and the full bale position shown in FIG. 2. Rollers 21, 22, 23 are driven in a counter-clockwise direction as viewed in FIGS. 1-3 by conventional means (for example, chains and sprockets or gears) connected with a drive shaft 28 which is in turn connected to the power-take-off of a tractor. A starter roll 30 is located adjacent roller 23 and is also driven counter-clockwise. A freely rotatable idler roller 31, also carried by arms 24, 25, moves in an arcuate path with sledge assembly 20 as it moves between its bale starting position (FIG. 1) and full bale position (FIG. 2). Idler roller 31 is clearly depicted in FIG. 7.

The bale forming chamber is further defined by a conventional apron 32 comprising a plurality of continuous side-by-side belts supported by guide rolls 33, 34, 35, 36, 37 which are rotatably mounted in tailgate 14. Apron 32 is also supported on a drive roll 38, rotatably mounted on main frame 11. Although apron 32 passes between roller 21 on sledge assembly 20 and idler roller 31, it is only in engagement with idler roller 31 and not roller 21 which is located in close proximity to the apron belts for the purpose of striping crop material from the belts. Suitable means (not shown) are connected with drive shaft 28 to provide rotation of drive roll 38 to provide rotation of drive roll 38 in a direction causing movement of apron 32 along its path in a direction indicated by arrows a and b in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2, respectively. Take up arms 41 carry additional guide rolls 43, 44 for supporting apron 32. Resilient means such as coil springs (not shown) are provided to normally urge take up arms 41 toward their inner positions (FIG. 1) while resisting movement thereof to their outer positions (FIG. 2).

When the elements of round baler 10 are disposed in the condition shown in FIG. 1 with tailgate 14 closed, an inner course c of apron 32 extends between lower front guide roll 33 and idler roll 31, and rollers 21, 22, 23 are inclined rearwardly on sledge assembly 20 to define the initial bale forming chamber, or as sometimes referred to, the core starting chamber. Apron inner course c forms the rear wall of the chamber while the inwardly facing moving peripheral surfaces of rollers 21, 22, 23 define a rearwardly inclined cooperating front wall. Floor roll 18 generally defines the bottom of the chamber between the front and rear walls thereof, and starter roller 30 is spaced from floor roll 18 to form a throat or inlet for the chamber, through which crop material is fed.

As round baler 10 is towed across a field, pickup tines 17 lift crop material from the ground and deliver it through the throat formed between floor roll 18 and roller 30 and thence into the bale forming chamber of baler 10. The crop material is carried rearwardly by floor roll 18 into engagement with apron inner course c (FIG. 1) which urges it upwardly and slightly forwardly into engagement with rollers 21, 22, 23. In this manner crop material is coiled in a generally clockwise direction as viewed in FIG. I to start a bale core. Continued feeding of crop material into the bale forming chamber by pickup tines 17 causes the apron inner course c to expand in length around a portion of the circumference of the bale core as the diameter increases. Take up arms 41 rotate from their inner position shown in FIG. 1 toward their outer position shown in FIG. 2 to provide for expansion of the inner course of the apron in a well known manner, i.e., in effect the outer course of the belts of apron 32 are diminished in length while the inner course increase in a like amount. After a bale has been formed and wrapped with sheet material, tailgate 14 is opened and the bale is ejected rearwardly. Subsequent closing of tailgate 14 returns the apron inner and outer courses of the belts of apron 32 to the locations shown in FIG. 1, and round baler 10 is ready to form another bale.

It will be understood that during formation of a bale, sledge assembly 20 also moves between a bale starting position (FIG. 1) to a full bale position (FIGS. 2 and 3). This movement of sledge assembly 20 causes idler roller 31 to move in an arcuate path while maintaining apron 32 in close proximity to roller 21, thereby allowing roller 21 to strip crop material from the belts of apron 32 and prevent or reduce significantly the loss of crop material between roller 31 and apron 32 during formation of a bale. Sledge assembly 20 is pushed outwardly towards its full bale position during bale formation as the crop material expands against the rollers and is pulled inwardly by apron 32 to the position shown in FIG. 1 during bale ejection without utilizing any additional mechanisms.

In an alternative embodiment of the round baler 10 which is not shown, apron 32 could comprise a pair of chains connected together at spaced intervals by transverse slats, and the idler roller 31 would be replaced by a pair of idler sprockets engaged with the chains. Aprons consisting of chains and slats are well known in the prior art as substitutes for side-by-side belt aprons. Also in this alternative embodiment the guide rolls would be replaced with guide sprockets for engaging the apron chains, and the drive roll 38 would be replaced by a pair of drive sprockets.

Figure 7:
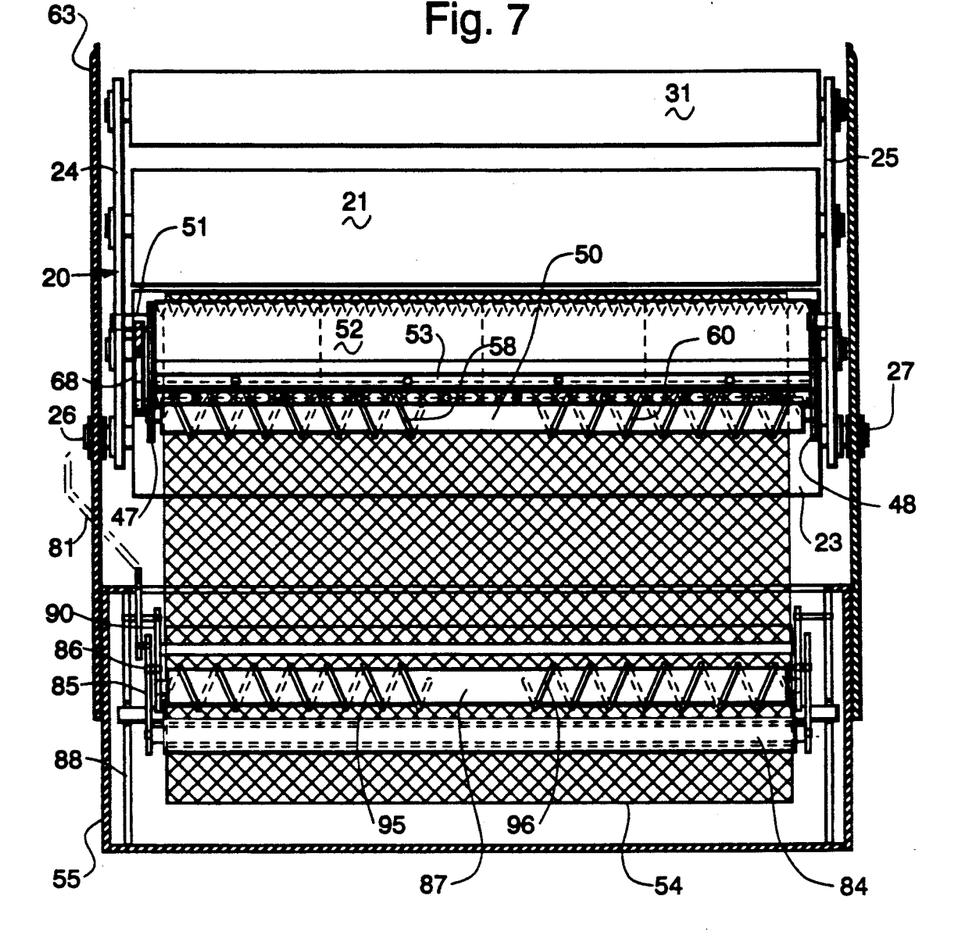
FIG. 7 is a view taken in the direction of arrows 7—7 in FIG. 1.

Now turning to the bale wrapping system in which the present invention is embodied, FIG. 1 shows a net dispensing mechanism 45 pivotally mounted on sledge assembly 20 and an interrelated cutting assembly 46 (phantom outline) pivotally mounted between the side walls on main frame 11. As best seen in FIG. 7 dispensing mechanism 45 comprises a pair of levers 47, 48 spaced apart, inter alia, by a transverse idler roll 50, discussed in further detail below. Levers 47, 48 are rotatably supported on a cross tube 51 that extends between arm 24, 25 of sledge assembly 20. The dispensing mechanism 45 further comprises transverse clamping members 52, 53 (see FIG. 2) also extending between levers 47, 48 and arranged to dispense into the forming chamber sheet material s such as net or the like from a supply roll 54 disposed in a container 55 carried on the baler main frame 11. Container 55 has an access lid for placement or removal of supply roll 54. Clamping members 52, 53 may be mounted between levers 47, 48 by bars such as those shown in U.S. Pat. No. 5,036,642, referred to above, which clamping structure and mounting arrangement are hereby incorporated by reference. Thus, as the sheet material s,s' is pulled from supply roll 54 via a slot 57 and guided to clamping members 52, 53 of dispensing mechanism 45, it passes under idler roller 50 which is mounted between and extends transversely of levers 47, 48. Idler roller 50 is provided with net spreading elements 58, 60 affixed to the outer end portions thereof, and spiraled outwardly in a fashion whereby the net passing over idler roll 50 is urged outwardly at the ends.

Referring now to FIGS. 2 and 3, the bale wrapping system also includes an electro-mechanical control system for sequentially actuating a net brake in conjunction with the net dispensing mechanism as it is moved between a net feeding operative position, as shown in FIG. 3, and a nonoperative retracted position, as shown in FIGS. 1 and 2. This system also provides for proper actuation of the net cutting assembly to avoid a premature release, the interrelated operation of which elements will be discussed in detail below. In FIGS. 1 and 2 an electric actuator 61 is shown in its retracted position whereas in FIG. 3 it is shown in solid lines in its extended position while the retracted position is shown in phantom outline.

Actuator 61 is pivotally mounted to plate 62, which is affixed to the outer surface of sidewall 63 of mainframe 11. A link member, 64, pivotally attached to actuator element 65, is pivoted about fixed pivot pin 66 between the retracted position shown in FIGS. 1 and 2 and the extended position shown in FIG. 3. Affixed to and adapted for rotation with pin 66 and inwardly of side wall 63 is lever 67 shown downwardly inclined in FIGS. I and 2 in the non-actuated position of actuated element 65. A net dispensing actuator arm 68 is pivotally connected to lever 67 via pin 70 inwardly of wall, whereby actuator arm 68 moves to the upward position shown in FIG. 3 under conditions where actuator element 65 is extended. When actuator element 65 is retracted, arm 68 is moved downwardly and net dispensing mechanism 45 is moved to the retracted non-operative position (FIG. 2).

Figure 5:
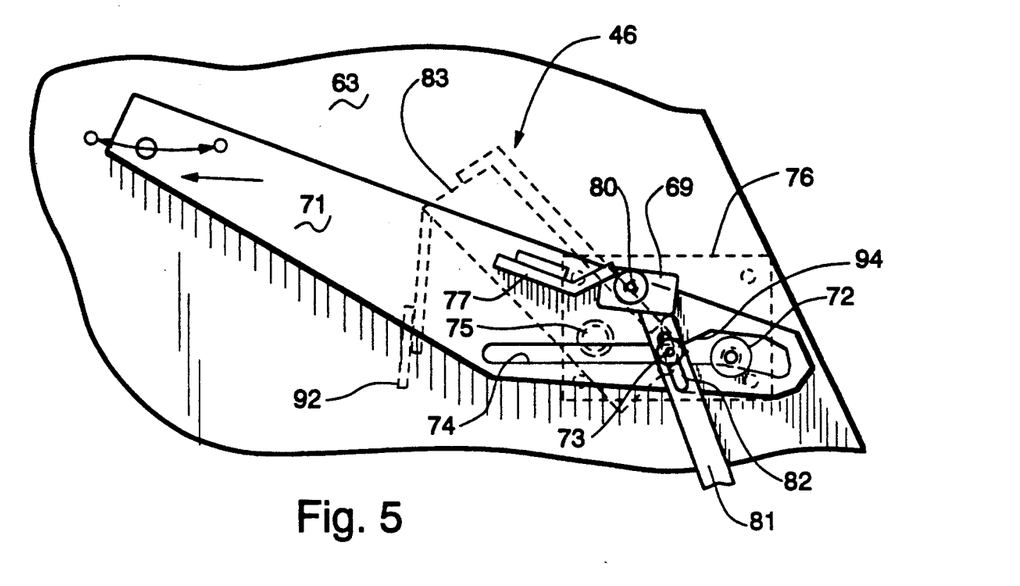
FIG. 5 is a detailed side elevational view of the control mechanism for the net wrapping apparatus of the present invention.
Figure 6:
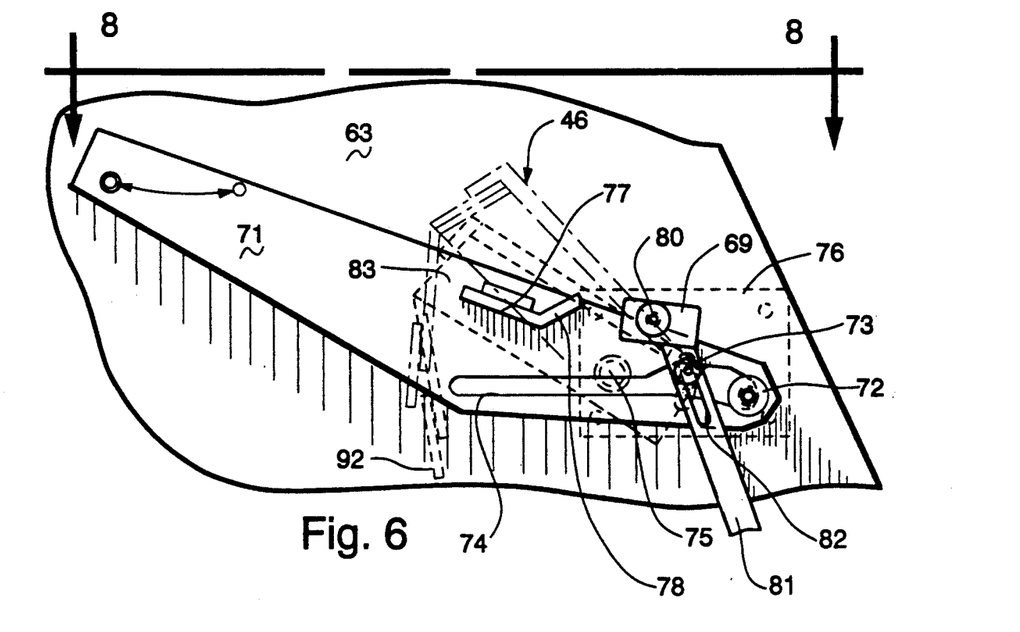
FIG. 6 is also a detailed side elevational view of the control mechanism for the net wrapping apparatus of the present invention and show the elements in an operational position different than shown in FIG. 5.
Figure 8:
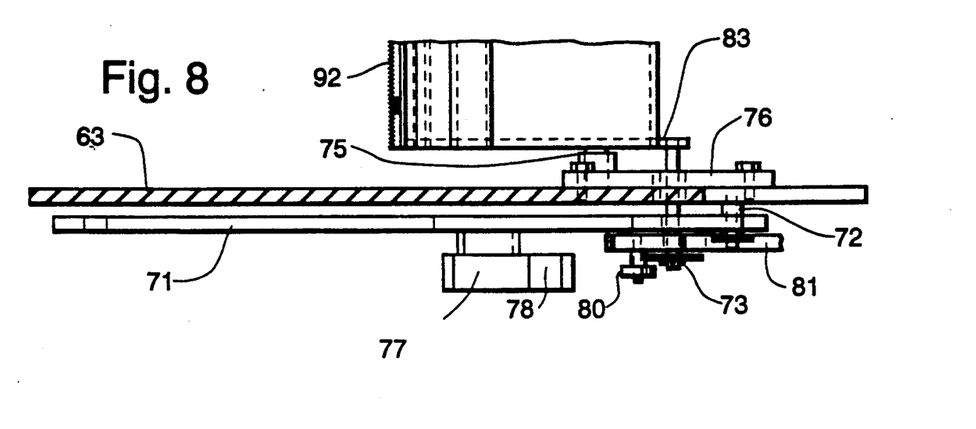
FIG. 8 is a view taken in the direction of arrows 8—8 in FIG. 6.

Pivotally attached to the lower end of link member 64 is a transverse control arm 71 which reciprocates in a generally for and aft direction in response to the position of actuator element 65. The right end of control arm 71 is primarily supported by fixed flanged roller 72 and secondarily supported by knife control roller 73, both of which extend through control arm slot 74. FIGS. 5, 6 and 8 show control arm 71 in detail with FIG. 6 depicting conditions when actuator element 65 (not shown in FIGS. 5 and 6) is fully retracted, and FIG. 5 showing control arm and related elements in an intermediate condition. Net cutting assembly 46 pivots around a fixed pivot via a stub shaft 75 affixed to plate 76 secured to the inside surface of side wall 63.

Secured in the intermediate area of control arm 71 is a ramp element 77 having a ramp section 78 positioned to engage a roller 80 secured to a leg member 69 which is integral with net brake control arm 81. A slot 82 in brake control arm 81 cooperates with knife roller 73 which is secured to knife side plate 83, which roller guides brake arm 81 along a reciprocal path via slot 82. As shown in FIG. 3 brake arm 81 is in its lowermost position when actuator element 65 is in its extended position, and thereby lifts net brake element 84 from the surface of the net supply roll by pivoting brake mounting arm 85 counterclockwise around pin 86. A counter roll 87 is pivotally mounted on a fixed bracket 88 via a counter roll mounting arm 90 and continually held in contact with the surface of net supply roll 54 by means of spring 91 which urges brake mounting arm downwardly and in turn urges counter roll mounting arm 90 downwardly. The number of rotations of roll 87 accurately determines the amount of net dispensed from roll 54. Thus, by counting the number of rotations of the counter roll the desired length of net dispensed can be determined by the known circumference of the bales being formed along with the desired number of wraps or fractional wraps.

Figure 4:
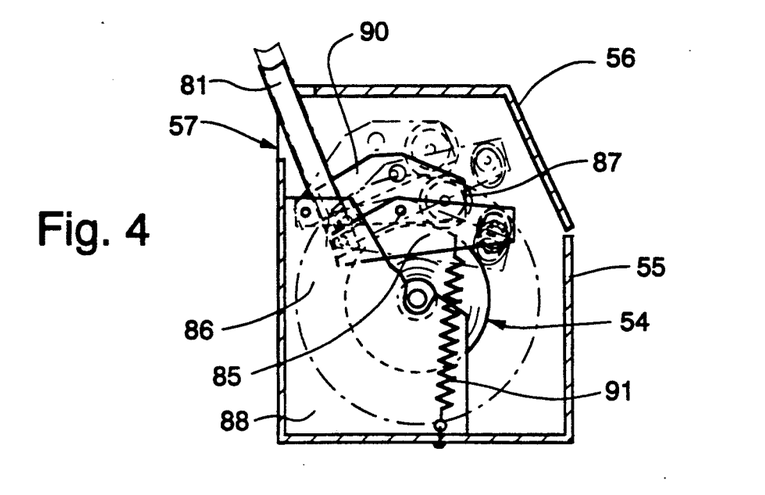
FIG. 4 is a side elevational view of the net roll supply system used in the net wrapping apparatus shown in FIG. 3.

FIG. 4 illustrates the position of the brake and counter roll assembly when the net from supply roll has been partially depleted. This unique arrangement provides for continuous contact between net supply roll 54 and counter roll 87 without changing the relationship of brake element 84 and the surface of the net roll, thereby providing for a substantially constant brake force regardless of roll size.

Net cutting assembly 46 includes a pair of knife side plates 83 (only one shown) rotatably supported on stub shaft 75. A knife 92 (only partially shown in FIG. 8) is carried by and extends transversely between knife side plates 83 for engagement with the net material dispensed by dispensing mechanism 45. A similar net cutting assembly that operates in the same general manner is shown in U.S. Pat. No. 5,036,642. For the purposes of this invention it is believed that the diagrammatic outline showing a cutting assembly in various positions will suffice.

Before describing the specific sequential steps of the present invention which will illustrate the unique inter-relationship of elements of the net dispensing mechanism, the general operation of the actuators, linkages and various other drive mechanisms and the like of baler 10, will be described. First turning to the point at which bale B has been formed and it is ready to be wrapped with net material, electric actuator 61 is activated while apron 32 continues to rotate bale B in a clockwise direction as viewed in FIG. 2. The outer surface of bale B is generally illustrated by heavy broken lines 93 in FIGS. 2 and 3. Actuator element 65 of electric actuator 61 drives control arm 71 from left to right and net dispensing actuator arm 81 from the solid line position of FIG. 2 to the solid line position of FIG. 3. This rotates the dispensing mechanism 45 from the position shown in FIG. 2 to position show in FIG. 3. As the dispensing mechanism 45 moves toward its dispensing position (FIG. 3), the cutting assembly 46 is rotated clockwise to the non operative position shown in FIG. 3 and clamping members 52, 53 move into a gap between roller 21 and apron 32. Meanwhile, net brake element 84 has been removed from the surface of supply roll 54 while counter roll 87 is maintained in operative contact therewith permitting the tail of the net material gripped between clamping members 52, 53 to be inserted through the gap into the bale forming chamber whereupon it is dragged downwardly and caught in the nip between roller 21 and bale B which are rotating in opposite directions. The net material is then dispensed along a path from the supply roll 21 via slot 57, around idler roller 50, between clamping members 52, 53, and then through the gap into the bale forming chamber where it is wrapped circumferentially around bale B while the bale continues to be rotated by apron 32. Counter roll 87 maintains light continuous contact with the surface of supply roll 54, at all times, thus permitting a minimum drag during dispensing.

After bale B has been wrapped with one or more layers of the net material, electric actuator 61 is reversed thereby moving dispensing mechanism 45 from the position shown in FIG. 2 to the position shown in FIG. 3. When dispensing mechanism 45 has been retracted, net cutting assembly 46 is rotated counterclockwise (FIG. 6) so that knife 92 is brought downwardly at the appropriate time into contact with the expanse of net material extending from clamping members 52, 53 of dispensing mechanism 45 to the periphery of roll 21. More specifically, knife side plates 83 rotate about stub shaft 75 under conditions where knife control roller 73 slides upwardly in brake arm slot 82 upon reaching the ramp 94 in slot 74 in transverse control arm 71. Knife 92 cuts the net material in a known manner and leaves a succeeding tail which is gripped by clamping members 52, 53 for future insertion into the bale forming chamber when the next bale is ready to be wrapped with net material. Prior to cutting, the net brake has been actuated by control arm 81 which travels upwardly via slot 82 when ramp 78 is clear of roller 80, which actuation permits braking force to be applied on the net resulting in necessary tension during cutting.

Now turning to the unique relationship of the elements of the net handling system with particular focus directed to the manner by which slack net is provided at the time the net wrapping is initiated, the sequential steps shown in FIGS. 9 to 14 will be discussed.

Figure 9:
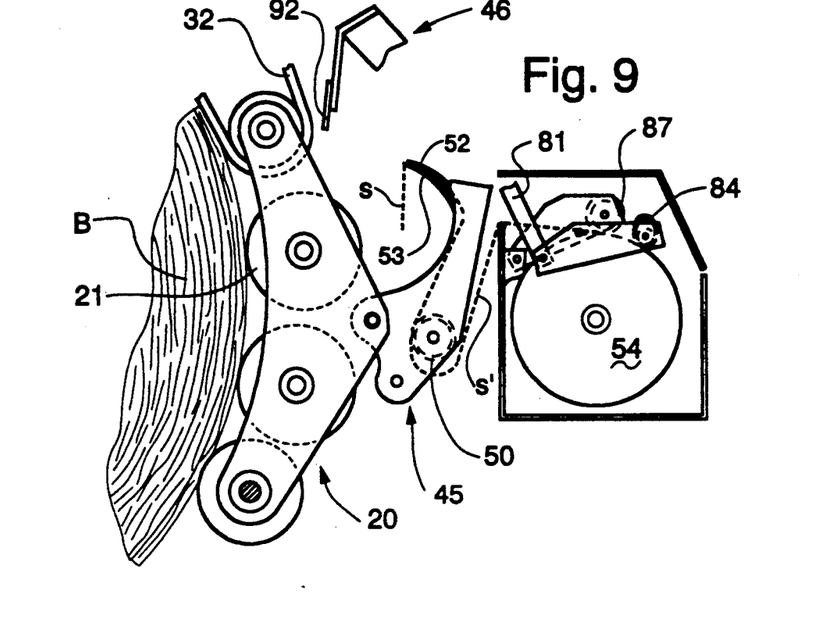
FIGS. 9 through 14 are diagrammatic side elevational views of the net wrapping apparatus and show a sequential relationship of the elements from the time a bale is formed in the chamber and ready for wrapping to the time after a wrapped bale has been discharged from the chamber.

In FIG. 9 net dispensing mechanism 45 is in HOME position and a completely formed bale B is shown in the bale chamber. Brake 84 is on, i.e., the downward force on net brake control arm 81 has been released and brake 84 is urged downward against net supply roll 54. Counter roll 87 is bearing against net supply roll 54 with a uniform predetermined force as is the case throughout all of the following sequential steps. Knife cutting assembly 46 is retracted with knife 92 in a position that is clear of the net path and net dispensing mechanism 45 regardless of its position. The net tail s is held between transverse clamping members 52, 53 at a predetermined length that is sufficient for wrap starting discussed in the following steps. It should be noted that in this position the net has been provided with slack that is shown as a loop below idler roll 50. The manner by which this slack is provided will be explained in relation to the last sequential step hereinafter, i.e., FIG. 14.

Figure 10:
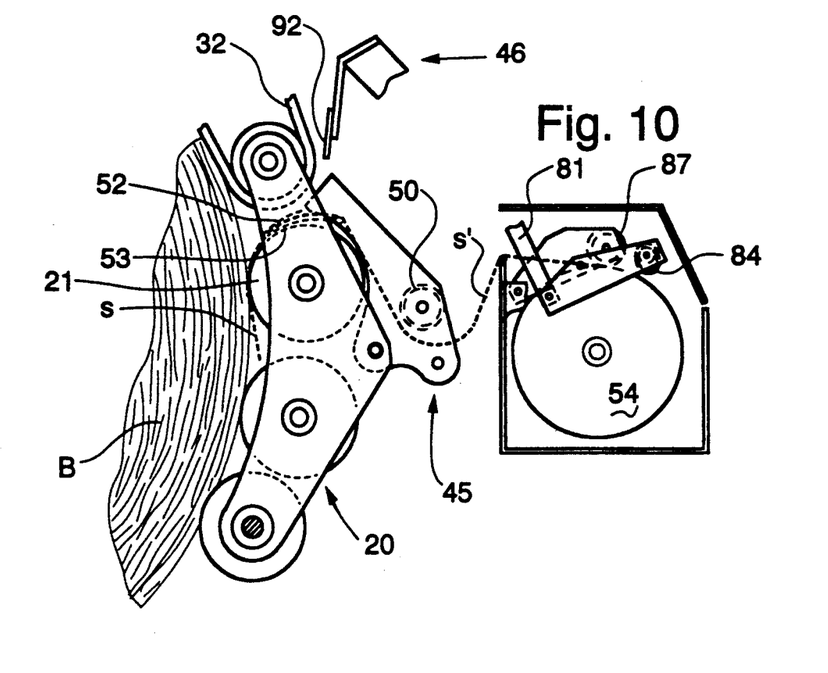

At this point in the operation, the machine either manually or automatically goes into the wrapping mode. FIG. 10 shows net dispensing mechanism 45 in INSERT position. The brake 84 has been released and net tail s has been inserted via clamping members 52, 53 between apron 32 and roll 21. The tail is being urged in a downward direction by virtue of it being gripped between the surfaces of bale B and roll 21 which are rotating in opposite directions. At this stage of the operation it is important that there is minimal resistance to the net, i.e., none or very little holding force. For reliable operation the net must start wrapping the bale as soon as it is inserted even though the friction may vary due to the non-uniform consistency of the outer surface of the bale B. At the heart of this invention is the existence of slack in the net at this phase of the net wrapping function. As shown in FIG. 9 some net slack exists in the HOME position which enhances start up of wrap in the INSERT position. Additionally, slack is also provided when net dispensing means 45 moves from HOME position to INSERT position, i.e., idler roll 50 is translated upwardly and away from the loop of slack net, thereby insuring that net tail s will be gripped between bale B and roll 21 adequately to hold it against the bale with a sufficient tangential force component to provide suitable pulling force to dispense the net from the supply roll during the entire wrapping phase.

Figure 11:
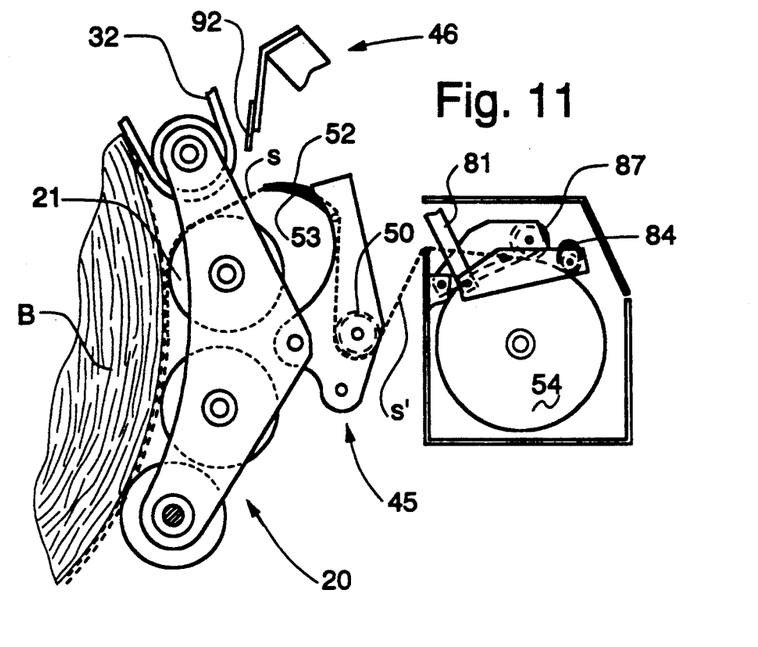

In FIG. 11 net dispensing mechanism 45 is shown pivoted to the PRECUT position to which it is driven after the slack is taken up in the net and at which it remains during the actual wrapping phase. During wrapping the brake 84 engages the net supply roll 54 to maintain sufficient force in the net to provide a compact neatly wrapped bale. This engagement takes place after the net tail s is firmly gripped between bale B and roll 21 as discussed above.

Figure 12:
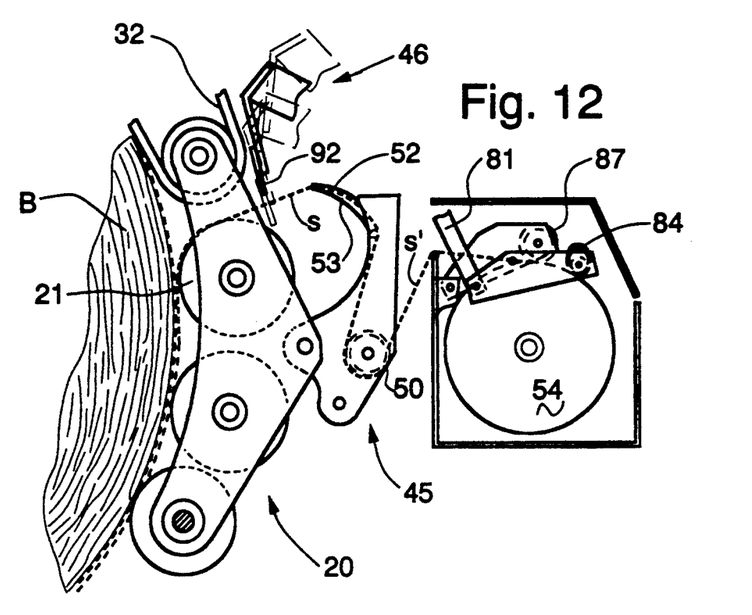
Figure 13:
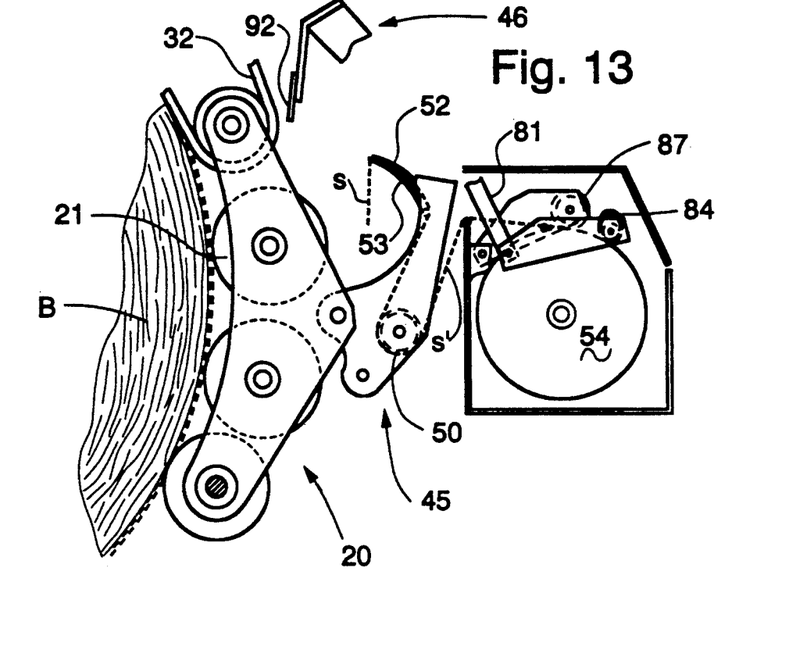
Figure 14:
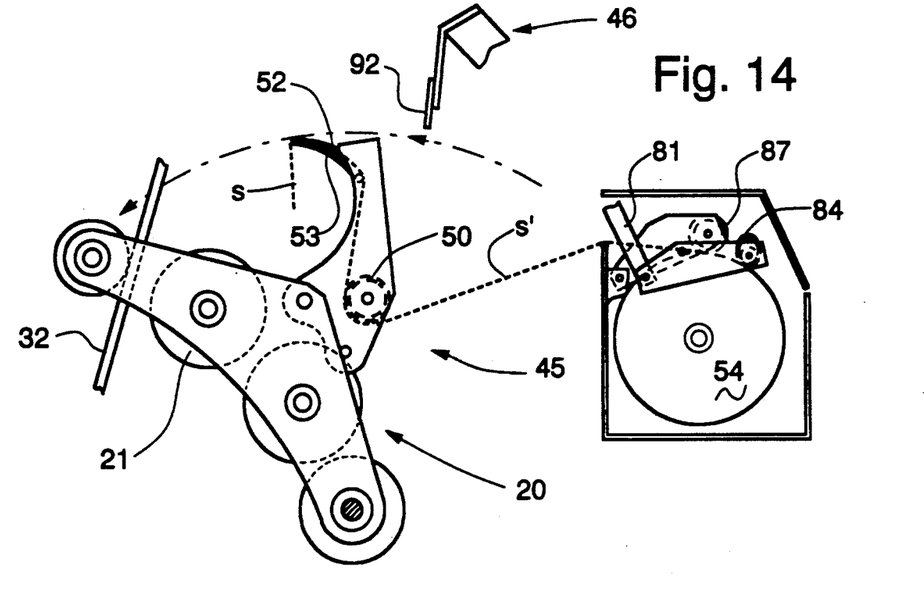

In the CUT position of the net dispensing mechanism 45 shown in FIG. 12 the brake remains engaged and the bale B continues to rotate in the forming chamber as net cutting assembly 46 is rotated downwardly to engage knife 92 with the net. Dispensing mechanism 45 is rotated away (as shown) from the knife to provide a taut stretch of net between roll 21 and grasping members 52, 53. After the net is severed, knife stays down until the bale ejection phase is initiated.

Subsequent to the CUT phase net dispensing mechanism 45 is rotated back to HOME position (FIG. 13) and the net cutting assembly is pulled up. Clamping members 52, 53 grasp the net sufficiently to maintain the net tail s at the predetermined desired length. This grasping force is sufficient to maintain the net tail length when sledge assembly 20 drops to the bale START position (FIG. 14) and the net is dispensed from the supply roll 54 by virtue of net dispensing assembly 45 being pulled away from HOME position to START position. During this phase the position of net between the supply roll and idler roll 50, designated s', increases and thereby provides the loop slack that is shown in FIG. 9 when bale B is being formed and thereby moves assembly 45 to the START position. This slack, mentioned hereinabove as being an important aspect of this invention, enhances significantly the reliability of the round baler net wrapping apparatus in which this invention is embodied. Also contributing to this reliability is the additional slack that is provided during the INSERT phase discussed above in conjunction with FIG. 10.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. A round baler for forming crop material into cylindrical bales, said baler having
    a main frame,
    a tailgate pivotally connected to said main frame,
    a sledge assembly mounted on said main frame for movement between a bale starting position and a full bale position, said sledge assembly including a plurality of rollers extending transversely of said main frame,
    an apron movably supported along a continuous path on said main frame and on said tailgate, said apron path having an inner course that cooperates with the rollers of said sledge assembly to define an expandable bale forming chamber, said bale forming chamber varies from an initial condition in which said sledge assembly is in said bale starting position to a fully expanded condition in which said sledge assembly is in said full bale position, and
    dispensing means carried on said sledge assembly for dispensing a continuous web of net material into said bale forming chamber so that the net material is wrapped circumferentially around a cylindrical bale of crop material in said bale forming chamber,
    said dispensing means pivotally mounted on said sledge assembly, means for moving said dispensing means between an extended position at which said net material is dispensed under conditions where said sledge assembly is in said full bale condition, and a retracted position,
    the improvement comprising
    guide means comprising a transverse idler roll, means for mounting said guide means on said dispensing means for operatively engaging said guide means with said net material under conditions where said dispensing means is in said retracted position, and for moving said guide means out of contact with said net material under conditions where said sledge moves from said bale starting position to said full bale position to provide slack in said material.

2. A round baler as set forth in claim 1 wherein
    said baler further includes a rotatably mounted roll for storing a supply of said net, and
    said transverse idler roll is disposed in the path between said supply and said dispensing means and the path of said net traverses beneath and in contact therewith when said dispensing means is in said retracted position.

3. A round baler as set forth in claim 2 wherein
    said slack in said net comprises a loop trained around the bottom surface of said idler roll and said loop increases in length when said dispensing means moves from said retracted position to said extended position.

4. A round baler as set forth in claim 1 wherein
    said round baler further includes a supply assembly for storing said net material, said supply assembly mounted generally forward of said dispensing means and on said main frame, said supply assembly comprising a rotatably mounted supply roll having a width substantially the same as the width of said bale forming chamber, and said means for guiding said net material from said supply roll to said dispensing means includes a transverse idler roll.

5. A round baler as set forth in claim 4 wherein
    said transverse idler roll is disposed in the path between said supply roll and said dispensing means and the path of said net transverse beneath said guide roll and in contact therewith when said dispensing means is in said retracted position.

6. A round baler as set forth in claim 5 wherein
    said slack in said net comprises a loop trained around the bottom surface of said idler roll and said loop increases in length when said dispensing means moves from said retracted position to said extended position.

* * * * *